US012731778B2

(12) United States Patent
Mai et al.

(10) Patent No.: US 12,731,778 B2
(45) Date of Patent: Sep. 8, 2026

(54) MICROBATTERY, AND PREPARATION METHOD THEREFOR AND USE THEREOF

(71) Applicant: WUHAN UNIVERSITY OF TECHNOLOGY, Wuhan (CN)

(72) Inventors: Liqiang Mai, Wuhan (CN); Wei Yang, Wuhan (CN); Fazhi Ye, Wuhan (CN); Lin Xu, Wuhan (CN)

(73) Assignee: WUHAN UNIVERSITY OF TECHNOLOGY, Wuhan (CN)

( * ) Notice: Subject to any disclaimer, the term of this patent is extended or adjusted under 35 U.S.C. 154(b) by 0 days.

(21) Appl. No.: 18/636,276

(22) Filed: Apr. 16, 2024

(65) Prior Publication Data

US 2024/0258495 A1 Aug. 1, 2024

Related U.S. Application Data

(63) Continuation of application No. PCT/CN2023/075369, filed on Feb. 10, 2023.

(30) Foreign Application Priority Data

Nov. 28, 2022 (CN) ........................ 202211499281.0

(51) Int. Cl.
*H01M 4/04* (2006.01)
*H01M 4/02* (2006.01)
(Continued)

(52) U.S. Cl.
CPC ....... *H01M 4/0452* (2013.01); *H01M 4/0457* (2013.01); *H01M 4/364* (2013.01);
(Continued)

(58) Field of Classification Search
CPC .. H01M 4/0452; H01M 4/0457; H01M 4/364; H01M 4/366; H01M 4/42;
(Continued)

(56) References Cited

U.S. PATENT DOCUMENTS 898,189 A * 9/1908 Cowper-Coles ......... C25D 3/58 205/240
9,819,011 B2 11/2017 Eckl et al.
(Continued)

FOREIGN PATENT DOCUMENTS

CN 103117396 A * 5/2013
CN 104120474 A * 10/2014
(Continued)

OTHER PUBLICATIONS

Clark et al, "Nanostructured manganese oxide and manganese oxide/polyethylenedioxythiophene rods electrodeposited onto nickel foam for supercapacitor applications." Journal of Applied Electrochemistry 47 (2017): 39-49 (Year: 2017).*
(Continued)

*Primary Examiner* — James Lin
*Assistant Examiner* — John Lee

(57) ABSTRACT

A method for preparing a microbattery includes: placing a micromachined thin metal-based interdigital electrode into a nickel sulfate and ammonium sulfate solution with a certain concentration; rapidly constructing a three-dimensional porous structure on the surface of the interdigital microelectrode by a bubble-templated electrodeposition method; then, mixing 3,4-ethylenedioxythiophene and manganese acetate with a certain constructing concentration; a manganese dioxide/3,4-ethylenedioxythiophene polymer thin film by a cyclic voltammetry deposition method; combining an obtained interdigital microelectrode cathode with a zinc interdigital anode; and then, coating the surface of the assembled electrode with a manganese sulfate/zinc sulfate/xanthan gum gel electrolyte, and conducting packaging to obtain the microbattery. The microbattery prepared by the present disclosure has the characteristics of small size, thin thickness, light weight, and extremely high power density/energy density, is capable of adapting to high-speed rotation (Continued)

and vibration environments due to its planar structure and extremely small mass and thickness.

8 Claims, 4 Drawing Sheets

(51) Int. Cl.
*H01M 4/36* (2006.01)
*H01M 4/42* (2006.01)
*H01M 4/50* (2010.01)
*H01M 4/583* (2010.01)
*H01M 4/60* (2006.01)
*H01M 10/0565* (2010.01)
*H01M 10/36* (2010.01)

(52) U.S. Cl.
CPC ............. *H01M 4/366* (2013.01); *H01M 4/42* (2013.01); *H01M 4/50* (2013.01); *H01M 4/583* (2013.01); *H01M 4/608* (2013.01); *H01M 10/0565* (2013.01); *H01M 2004/027* (2013.01); *H01M 2004/028* (2013.01); *H01M 10/36* (2013.01)

(58) Field of Classification Search
CPC ........ H01M 4/50; H01M 4/583; H01M 4/608; H01M 10/0565; H01M 10/36; H01M 2004/027; H01M 2004/028; H01M 4/0404; H01M 4/78; H01M 4/08
USPC ............................................................ 205/57
See application file for complete search history.

(56) References Cited

U.S. PATENT DOCUMENTS 10,461,318 B2 10/2019 Zeng et al.
11,031,585 B2 6/2021 Ota
2011/0059333 A1* 3/2011 Yeh .................... H01M 4/0438 977/773

FOREIGN PATENT DOCUMENTS

CN 108242531 A * 7/2018 .......... H01M 10/052
CN 114381757 A * 4/2022 ............... C25B 1/04
KR 20170004266 A * 1/2017

OTHER PUBLICATIONS

Marozzi et al, “Development of electrode morphologies of interest in electrocatalysis: Part 2: Hydrogen evolution reaction on macroporous nickel electrodes.” Electrochimica acta 46.6 (2001): 861-866 (Year: 2001).*

Omale et al, “ High-areal capacity microbatteries from symmetrical interdigitated 3D nanowire network electrodes”, 2018 (Year: 2018).*

Su et al. “Co-electro-deposition of the MnO 2âPEDOT: PSS nanostructured composite for high areal mass, flexible asymmetric supercapacitor devices.” Journal of Materials Chemistry A 1.40 (2013): 12432-12440 (Year: 2013).*

Xu et al, “Fabricating a gel electrolyte based on lignin-coated nanosilica to enhance the reversibility of zinc anodes for rechargeable aqueous Zn/MnO2 batteries.” ACS Sustainable Chemistry & Engineering 10.6 (2022): 2063-2071 (Year: 2022).*

Zeng et al., “Achieving ultrahigh energy density and long durability in a flexible rechargeable quasiâsolidastate ZnâMnO2 battery.” Advanced Materials 29.26 (2017): 1700274 (Year: 2017).*

Zhao et al., “Facile electrodeposition of freestanding MnO2/CNT film for high-performance on-chip all-solid-state rechargeable zinc-ion microbattery.” Materials Letters 292 (2021): 129614 (Year: 2021).*

Sakhairi et al. “Effect of Zinc Precursor on Interdigitated Electrode using Electrochemical Deposition Method.” 2021 IEEE Regional Symposium on Micro and Nanoelectronics (RSM). IEEE, 2021 (Year: 2021).*

Rusi, and S. R. Majid. “Effects of electrodeposition mode and deposition cycle on the electrochemical performance of MnO2—NiO composite electrodes for high-energy-density supercapacitors.” PloS one 11.5 (2016): e0154566. (Year: 2016).*

* cited by examiner

MICROBATTERY, AND PREPARATION METHOD THEREFOR AND USE THEREOF

CROSS-REFERENCE TO RELATED APPLICATIONS

This application is a continuation of International Patent Application No. PCT/CN2023/075369 with a filing date of Feb. 10, 2023, designating the United States, now pending, and further claims priority to Chinese Patent Application No. 202211499281.0 with a filing date of Nov. 28, 2022. The content of the aforementioned application, including any intervening amendments thereto, is incorporated herein by reference.

TECHNICAL FIELD

The present disclosure relates to the crossing technical field of energy storage nanomaterials, micromachining processes, and detection technologies, and in particular, to a microbattery and a preparation method therefor and use thereof.

BACKGROUND

For currently known high-speed rotating equipment, it is difficult to monitor its safety. For example, for a long time, it has been difficult to achieve an in-situ monitoring technology for high-speed rotating equipment represented by vessel propellers, electric multiple unit (EMU) wheel sets, aircraft compressors, and the like. Only cumbersome maintenance steps such as multi-labor mechanical disassembly can be adopted, which greatly increases the maintenance cost.

A microbattery has the advantages of small size, light self-weight, simple structure, and the like and can provide high energy density and power density even at an extremely small size (less than 5 mm), an extremely thin thickness (less than 200 μm), and an extremely light weight (less than 50 mg), so the microbattery can apply to more scenarios compared with commercial small-sized button batteries. Therefore, it can provide energy for devices such as intelligent network nodes, micro-nano sensors, and microrobots in extreme environments.

The current small-sized button batteries generally use a dense active material loading mode to improve the energy density, but the electron/ion conductivity is extremely poor, so the voltage platform is low and the operating current is extremely small, and they can only supply power for nanoampere- to submicroampere-level electronic equipment, greatly limiting their application scenarios.

SUMMARY

In view of the foregoing, the present disclosure provides a microbattery and a preparation method therefor and use thereof to solve the problem of difficulty in monitoring the safety of existing high-speed rotating equipment.

To achieve the above objective, the present disclosure makes use of the following technical solution:

a method for preparing a microbattery, including the following steps:

S1: preparing a manganese dioxide/3,4-ethylenedioxythiophene polymer microelectrode comprisings:

S11: mixing nickel sulfate and ammonium sulfate to obtain a mixed solution A; and in the mixed solution A, using a metal-based micro interdigital microelectrode as a working electrode and adopting a three-electrode deposition method at a constant voltage to obtain a porous metal microelectrode; and

S12: mixing manganese acetate and 3,4-ethylenedioxythiophene to obtain a mixed solution B; and in the mixed solution B, using the porous metal microelectrode as a working electrode and adopting an electrodeposition process at a constant voltage to obtain the manganese dioxide/3,4-ethylenedioxythiophene polymer microelectrode;

S2: preparing a zinc-coated carbon nanotube microelectrode comprising:

S21: dispersing carbon nanotubes into an ethanol solution, adding magnesium nitrate, and mixing a resulting mixture uniformly to obtain a mixed solution C; and in the mixed solution C, using a platinum sheet and a brass microelectrode as a cathode and an anode, respectively, and adopting an electrophoresis process under a constant voltage power supply to obtain an interdigital microelectrode; and

S22: mixing zinc sulfate and sodium sulfate to obtain a mixed solution D; and in the mixed solution D, using the interdigital microelectrode as a working electrode and adopting a constant voltage deposition method to deposit a metal zinc nanosheet on the surface of the working electrode to obtain the zinc-coated carbon nanotube microelectrode; and

S3: assembling the microbattery comprising:

S31: using the manganese dioxide/3,4-ethylenedioxythiophene polymer microelectrode and the zinc-coated carbon nanotube microelectrode as a cathode and an anode, respectively, and assembling the cathode and the anode under an optical microscope; and

S32: coating a surface of the assembled electrode with a manganese sulfate/zinc sulfate/xanthan gum gel electrolyte, and conducting packaging to obtain the microbattery.

According to the above technical solution, in the mixed solution A, a mass ratio of the nickel sulfate to the ammonium sulfate is 1:(1-10); and in the mixed solution B, a mass ratio of the manganese acetate to the 3,4-ethylenedioxythiophene is 0.5 to (10:1).

According to the above technical solution, in the step S11, the adopting a three-electrode deposition method at a constant voltage includes: using a metal-based interdigital microelectrode as a working electrode, a platinum sheet as a counter electrode, and a silver/silver chloride electrode as a reference electrode, and conducting deposition at a constant voltage of −3 V to −5 V for 10 s to 200 s.

According to the above technical solution, in the step S12, the electrodeposition process includes: using a metal-based interdigital microelectrode as a working electrode, a platinum sheet as a counter electrode, and a silver/silver chloride electrode as a reference electrode, and conducting cyclic deposition for 10 to 200 cycles at a scan rate of 1 $mV\ s^{-1}$ to 50 $mV\ s^{-1}$ and at a voltage of 0 V to 0.9 V.

According to the above technical solution, in the mixed solution C, a mass ratio of the carbon nanotubes to the magnesium nitrate is 0.5 to (10:1); and in the mixed solution D, a mass ratio of the zinc sulfate to the sodium sulfate is 1 to (5:1).

According to the above technical solution, in the step S21, the electrophoresis process includes: using a platinum sheet as a cathode, and a brass copper, nickel, stainless steel, or titanium microelectrode as an anode.

According to the above technical solution, in the step S22, the constant voltage deposition method includes: conducting deposition at a constant voltage of 10 V to 60 V for 1 min to 30 min.

According to the above technical solution, in the step S32, a method for preparing the manganese sulfate/zinc sulfate/xanthan gum gel electrolyte includes: adding manganese sulfate and zinc sulfate into water, sonicating and stirring a resulting mixture uniformly, and then adding xanthan gum and mixing a resulting mixture uniformly.

On the basis of the above technical solution, a second objective of the present disclosure is to provide a microbattery, which is prepared by the above method for preparing a microbattery.

On the basis of the above technical solution, a third objective of the present disclosure is to provide use of the microbattery in a sensor system for monitoring high-speed rotating and enclosed components.

Compared with the prior art, the present disclosure has the following advantages:

(1) The present disclosure obtains the microbattery by constructing a three-dimensional porous structure on the basis of conducting electrodeposition on an interdigital microelectrode prepared by a micromachining process, loading active battery materials on the surface of the three-dimensional porous structure, matching the structure with the anode of the interdigital microelectrode, and conducting electrolyte coating and packaging. The microbattery can cope with conditions such as more intense vibration and acceleration due to its simple structure, physically separated cathode and anode, and stronger robustness.

(2) The microbattery prepared by the present disclosure has the advantages of small size, thin thickness, light weight, extremely high power density/energy density, simplicity in preparation, easiness for integration, and the like. After being integrated with a small-size commercial sensor system, on one hand, the microbattery can stably provide energy output; and on the other hand, it can adapt to high-speed rotation and vibration environments, exhibiting a potential for commercial application.

BRIEF DESCRIPTION OF THE DRAWINGS

To describe the technical solutions of the present disclosure or in the prior art more clearly, the following briefly describes the accompanying drawings required for describing the embodiments or the prior art. Apparently, the accompanying drawings in the following description show some embodiments of the present disclosure, and a person of ordinary skill in the art may further derive other accompanying drawings from these accompanying drawings without creative efforts.

DETAILED DESCRIPTION OF THE EMBODIMENTS

Figure 1:
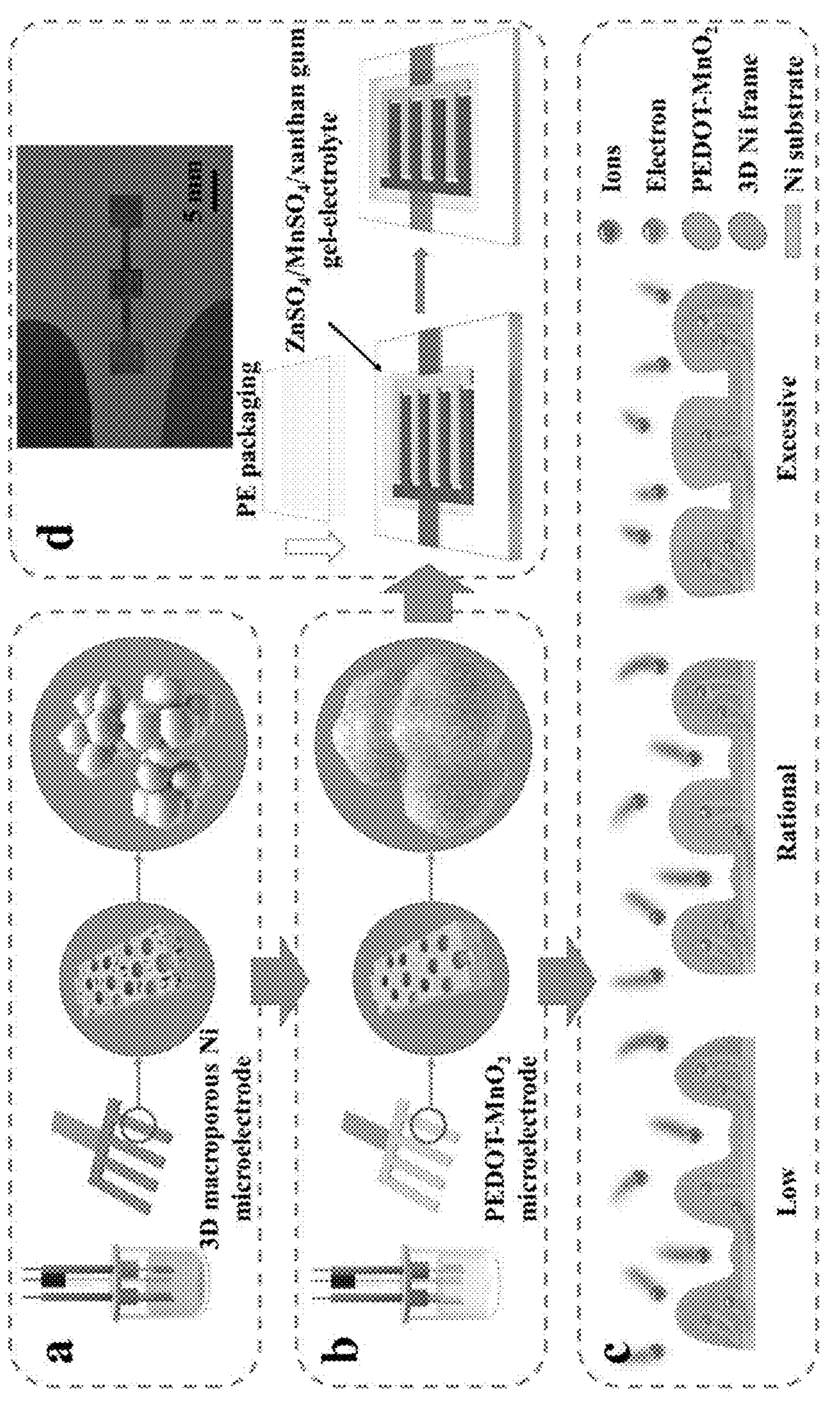
FIG. 1 shows a schematic diagram illustrating a main process flow of a microbattery according to an embodiment of the present disclosure.

To make the foregoing objectives, features, and advantages of the present disclosure clearer and more comprehensible, the embodiments of the present disclosure will be further described in detail below with reference to the accompanying drawings.

It should be noted that, in the description of the embodiments of the present application, the description of the term "some embodiments" means that the specific features, structures, materials, or characteristics described in combination with the embodiments or examples are included in at least one embodiment or example of the present disclosure. In this specification, the schematic representation of the above term does not necessarily refer to the same embodiment or example. Moreover, the specific features, structures, materials, or characteristics described may be combined in any suitable manner in any one or more embodiments or examples.

In the embodiments of the present disclosure, "in a range of . . . " includes both end values, for example, "in a range of 1 to 100" includes both end values of 1 and 100.

An embodiment of the present disclosure provides a method for preparing a microbattery, including the following steps:

S1: prepare a manganese dioxide/3,4-ethylenedioxythiophene polymer microelectrode

S11: mix nickel sulfate and ammonium sulfate, and sonicate a resulting mixture at room temperature for 15 min and stir the same for 15 min to obtain a light green mixed solution A; and in the mixed solution A, use a metal-based interdigital microelectrode prepared by micromachining as a working electrode, a platinum sheet as a counter electrode, and a silver/silver chloride electrode as a reference electrode, and conduct deposition at a constant voltage of −3 V to −5 V for 10 s to 200 s to obtain a porous metal microelectrode.

Here, the metal-based interdigital microelectrode prepared by micromachining refers to a metal-based four-interdigital microelectrode prepared by laser engraving, machine tool processing, and wet etching, with the width of a single interdigital being 360 μm, the whole electrode specification being 3900 μm×3600 μm, and the thickness being 10 μm to 200 μm.

S12: mix manganese acetate and 3,4-ethylenedioxythiophene (EDOT), and sonicate and stir a resulting mixture to obtain a mixed solution B; and in the mixed solution B, use the porous metal microelectrode as a working electrode, a platinum sheet as a counter electrode, and a silver/silver chloride electrode as a reference electrode, and conduct cyclic deposition for 10 to 200 cycles at a scan rate of 1 mV $s^{-1}$ to 50 mV $s^{-1}$ and at a voltage of 0 V to 0.9 V to obtain the manganese dioxide/3,4-ethylenedioxythiophene polymer microelectrode.

Here, in the mixed solution A, the mass ratio of the nickel sulfate to the ammonium sulfate is 1:(1-10); and in the mixed solution B, the mass ratio of the manganese acetate to the 3,4-ethylenedioxythiophene is 0.5 to (10:1).

S2: prepare a zinc-coated carbon nanotube microelectrode

S21: disperse carbon nanotubes (CNTs) into an ethanol solution, add magnesium nitrate, sonicate a resulting mixture for 50 min to 70 min and mix the same uniformly to obtain a black mixed solution C; and in the mixed solution C, use a platinum sheet and a brass microelectrode as a cathode and an anode, respectively, electrophoreze the carbon nanotubes on the surface of the microelectrode at a constant voltage, and then dry the microelectrode to obtain a uniform black interdigital microelectrode.

S22: mix zinc sulfate and sodium sulfate to obtain a mixed solution D; and in the mixed solution D, use the interdigital microelectrode as a working electrode, a platinum sheet as a counter electrode, and a silver/silver chloride electrode as a reference electrode to form a three-electrode system, and adopt a constant voltage deposition method to deposit a metal zinc nanosheet on the surface of the working electrode to obtain the zinc-coated carbon nanotube microelectrode.

In the mixed solution C, the mass ratio of the carbon nanotubes to the magnesium nitrate is 0.5 to (10:1); and in the mixed solution D, the mass ratio of the zinc sulfate to the sodium sulfate is 1 to (5:1).

S3: assemble the microbattery

S31: use the manganese dioxide/3,4-ethylenedioxythiophene polymer microelectrode and the zinc-coated carbon nanotube microelectrode as a cathode and an anode, respectively, and assemble the same under an optical microscope; and S32: coat the surface of the assembled electrode with a manganese sulfate/zinc sulfate/xanthan gum gel electrolyte, apply a square thin polyethylene (PE) film, and then packaging the periphery of the square thin PE film with a sealant to obtain the microbattery.

Here, a method for preparing the manganese sulfate/zinc sulfate/xanthan gum gel electrolyte includes: adding manganese sulfate and zinc sulfate into water, sonicating and stirring a resulting mixture until it is clarified, adding xanthan gum at a mass ratio of 0.1 g/mL to 2 g/mL, and stirring a resulting mixture at 40° C. for 50 min to 70 min and mixing the same uniformly to obtain the gel electrolyte.

The present disclosure obtains a zinc-manganese microbattery using manganese dioxide as a main active material by: placing a micromachined thin metal-based interdigital electrode into a nickel sulfate and ammonium sulfate solution with a certain concentration; rapidly constructing a vertical three-dimensional porous structure composed of micron nickel particle clusters on the surface of the interdigital microelectrode by adopting a bubble-templated electrodeposition method; then, mixing 3,4-ethylenedioxythiophene and manganese acetate with a certain concentration; constructing an active material thin film mixed with a manganese dioxide/3,4-ethylenedioxythiophene polymer on the surface of the three-dimensional porous nickel structure in one step by adopting a cyclic voltammetry deposition method, the active material thin film having a vertical three-dimensional porous structure similar with that of three-dimensional porous nickel and having a large electrolyte/active material contact area while obtaining a high loading amount of active materials; combining the obtained interdigital microelectrode that is used as a cathode with a zinc interdigital anode; and then, coating the combined electrode with the manganese sulfate/zinc sulfate/xanthan gum gel electrolyte and conducting packaging.

It can be understood that the microbattery having a double-interdigital structure divides the cathode and the anode through an extremely small interdigital space, and there is a long and narrow cathode/anode ion transport channel between the two electrodes. With the increase of the thicknesses of the cathode/anode material, the cathode/anode ion transport distance remains unchanged. Therefore, the microbattery is considered as a microbattery configuration with the highest power density. To sum up, the microbattery prepared by the present disclosure has the advantages of small size, thin thickness, light weight, extremely high power density/energy density, simplicity in preparation, easiness for integration, and the like. After being integrated with a small-size commercial sensor system, on one hand, the microbattery can stably provide energy output; and on the other hand, it can cope with conditions such as more intense vibration and acceleration due to its simple structure, physically separated cathode and anode, and stronger robustness, thereby being capable of adapting to high-speed rotation and vibration environments.

To resist a high centrifugal force, an energy storage device used for high-speed rotation should have the geometric characteristics of thin thickness and light weight. Restricted by its geometric characteristics, it is more difficult for the energy storage device to obtain high energy density and power density. Although a conventional thin film battery can have high energy density, electrodes are too dense and the ion transport speed is slow under a high loading amount of active materials. With regard to the microbattery prepared by the present disclosure, the contact area between the electrolyte and the electrodes is extremely expanded by constructing the vertical porous structure, which is an important strategy to improve the power density.

Furthermore, with the progress of micromachining, new energy resources, and electronic technologies, the microbattery, used as a core unit of micro and portable electronic equipment, will have a broader application prospect.

On the basis of the above technical solution, another embodiment of the present disclosure provides a microbattery, which is prepared by the above method for preparing a microbattery.

On the basis of the above technical solution, yet another embodiment of the present disclosure provides use of the microbattery in a sensor system for monitoring high-speed rotating and enclosed components.

On the basis of the above embodiments, the following examples are provided to further describe the present disclosure. It should be understood that these examples are only intended to illustrate the present disclosure rather than to limit the scope of the present disclosure. The experimental methods in the following examples are generally carried out according to the conditions recommended by the manufacturer if no conditions are indicated herein. The percentages and parts are calculated by mass, unless otherwise stated.

Example 1

This example provides a method for preparing a microbattery, including the following steps:

1: Preparation of a Manganese Dioxide/3,4-Ethylenedioxythiophene Polymer Microelectrode:

1) 0.1 mol/L nickel sulfate and 0.5 mol/L ammonium sulfate were added into 20 mL of water, and a resulting mixture was sonicated at room temperature for 15 min and stirred for 15 min to obtain a light green mixed solution;

2) in the solution obtained in the step 1), a three-electrode deposition method was adopted by using a micromachined thin metal-based interdigital microelectrode as a working electrode, a platinum sheet as a counter electrode, and a silver/silver chloride electrode as a reference electrode, and deposition was conducted at a constant voltage of −4.5 V for 100 s to obtain a porous metal microelectrode;

3) 0.245 g of manganese acetate tetrahydrate and 100 μL of EDOT were added into 20 mL of water, and a resulting mixture was sonicated and stirred for 1 min to obtain a milky white dispersion; and 4) in the solution obtained in the step 3), a porous nickel interdigital microelectrode was used as a working electrode, a platinum sheet was used as a counter electrode, and a silver/silver chloride electrode was used as a reference electrode to form a three-electrode system, and electrodeposition was conducted for 70 cycles at a scan rate of 50 mV $s^{-1}$ and at a voltage of 0 V to 1.2 V by adopting a cyclic voltammetry method to obtain the manganese dioxide/3,4-ethylenedioxythiophene polymer microelectrode;

2: Preparation of a Zinc Anode Microelectrode:

5) 20 mg of carbon nanotubes (CNTs) were dispersed into 20 mL of an ethanol solution, 10 mg of magnesium nitrate particles were added, and a resulting mixture was sonicated for 1 hour to obtain a black uniform dispersion;

6) in the dispersion obtained in the step 5), a brass interdigital microelectrode was used as an anode, and a platinum electrode was used as a cathode; the carbon nanotubes were electrophorezed on the surface of the microelectrode for 600 s at a constant voltage of 10 V; and the obtained microelectrode was dried to obtain a uniform black interdigital microelectrode;

7) the black interdigital microelectrode obtained in the step 6) was used as a working electrode, a platinum sheet was used as a counter electrode, and a silver/silver chloride electrode was used as a reference electrode to form a three-electrode system; deposition was conducted by adopting a constant voltage deposition method at a constant voltage of −1.1 V for 600 s; and a metal zinc nanosheet was deposited on the surface of the working electrode in a mixed solution of 0.5 mol/L zinc sulfate and 0.5 mol/L sodium sulfate to obtain a zinc-coated carbon nanotube (Zn@CNT) microelectrode;

3: Preparation of a Manganese Sulfate/Zinc Sulfate/Xanthan Gum Gel Electrolyte:

8) 0.4 mol/L manganese sulfate and 2 mol/L zinc sulfate were added into 20 mL of water, and a resulting mixture was sonicated and stirred thoroughly to obtain a clear solution;

9) in the solution obtained in the step 8), 0.7 g of xanthan gum was added and a resulting mixture was stirred to obtain the gel electrolyte;

4: Assembly of the Manganese Dioxide/3,4-Ethylenedioxythiophene Polymer Microelectrode and the Zinc Anode Microelectrode:

9) the prepared manganese dioxide/3,4-ethylenedioxythiophene polymer microelectrode and the Zn@CNT microelectrode used as an anode were assembled under an optical microscope;

10) the surface of the assembled electrode in the step 9) was coated with the manganese sulfate/zinc sulfate/xanthan gum gel electrolyte and covered with a square thin PE film, and then the periphery of the square thin PE film was packaged with a sealant to obtain the microbattery; and 11) the above microbattery was adhered to the surface of a rotary device and connected to a sensor system integrated on its surface in series to supply power for the system.

As shown in the schematic diagram illustrating a main process flow of the microbattery in FIG. 1, specific steps include: (a) preparing a three-dimensional porous nickel interdigital electrode by using a bubble-templated method; (b) using the porous nickel interdigital electrode as a substrate and electrodepositing a solution by a cyclic voltammetry method to obtain a manganese dioxide/3,4-ethylenedioxythiophene polymer microelectrode; (c) demonstrating a strategy for achieving high-mass loading and constructing an effective ion transport channel; and (d) combining the manganese dioxide/3,4-ethylenedioxythiophene polymer microelectrode with a zinc interdigital microelectrode, and conducting PE packaging after coating with a gel electrolyte to obtain the microbattery.

Figure 2:
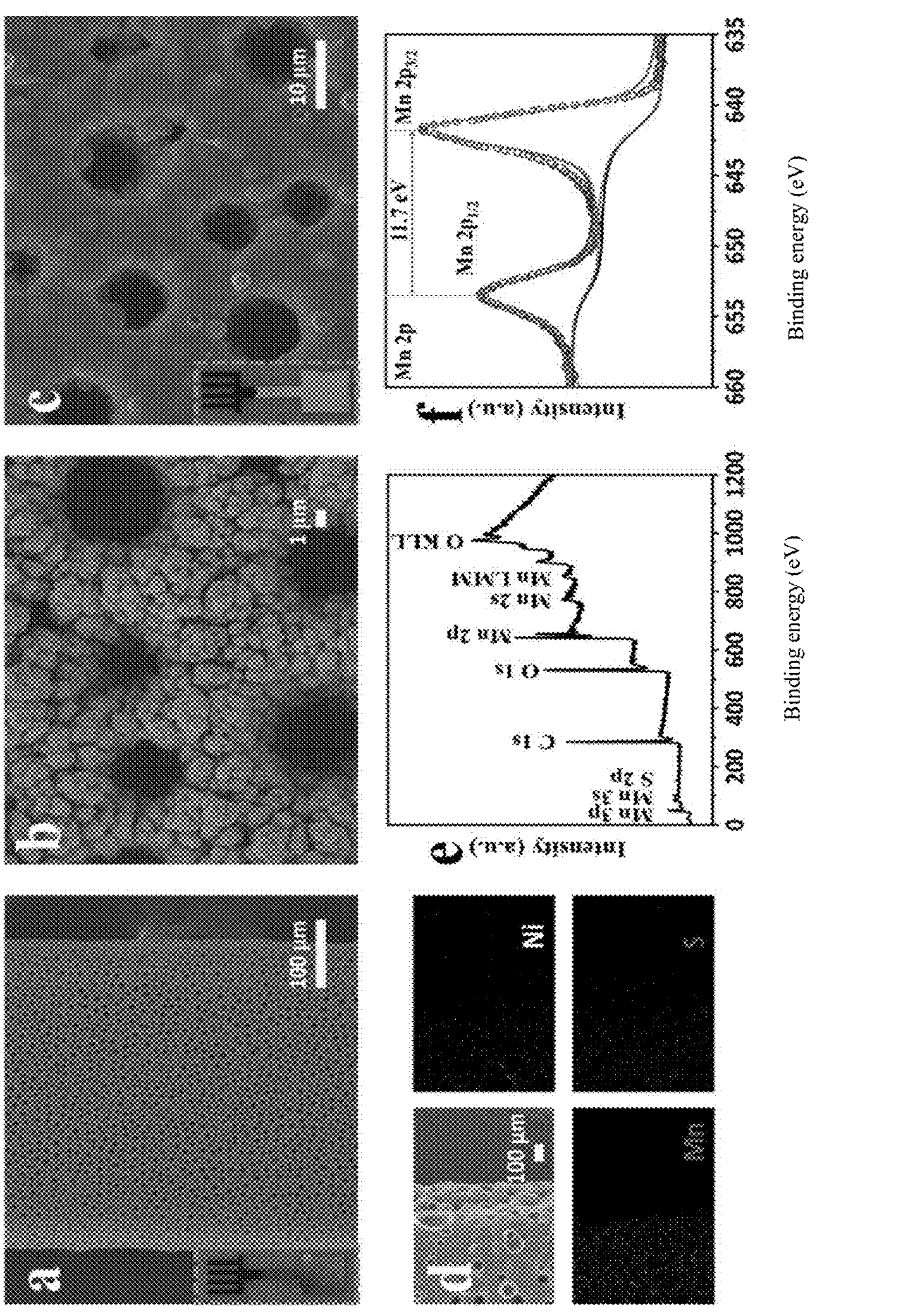
FIG. 2 shows scanning electron microscope images and energy spectrum characterization graphs of the manganese dioxide/3,4-ethylenedioxythiophene polymer microelectrode according to Example 1 of the present disclosure.

The manganese dioxide/3,4-ethylenedioxythiophene polymer microelectrode prepared in the step 4) according to Example 1 was taken for example and the results of morphologic analysis by using a scanning electron microscope and material surface analysis by using an X-ray photoelectron spectrometer are shown in FIG. 2.

FIGS. 2(*a*)-2(*b*) show magnified images of the porous nickel interdigital microelectrode, from which it can be seen that a large number of porous structures are distributed on the surface of the microelectrode, thereby providing an extremely large specific surface area for the electrode. It can be seen from the scanning electron microscope images that a macroporous structure appears vertically inward on the surface of the electrode and is a porous spatial network structure constructed by interweaving nanowires in different existing technologies. FIG. 2(*c*) shows a manganese dioxide/3,4-ethylenedioxythiophene polymer microelectrode microstructure. A porous nickel framework provides enough space and surface for the growth of active substances and the pore size has not changed greatly compared with the porous nickel microelectrode, which will provide abundant ion transport paths for electrolyte ions. FIG. 2(*d*) shows an energy dispersive spectrometer (EDS) map of the edge of the manganese dioxide/3,4-ethylenedioxythiophene polymer microelectrode, which proves that elements Mn, S, and Ni are distributed uniformly and manganese dioxide and 3,4-ethylenedioxythiophene polymers are uniformly coated on the surface of the microelectrode. FIGS. 2(*e*)-2(*f*) show X-ray photoelectron spectrometer (XPS) patterns of the manganese dioxide/3,4-ethylenedioxythiophene polymer microelectrode, proving that the microelectrode contains elements S, C, O, and Mn, and the spin-energy separation of 11.7 eV corresponds to 2p electrons of $Mn^{4+}$.

Figure 3:
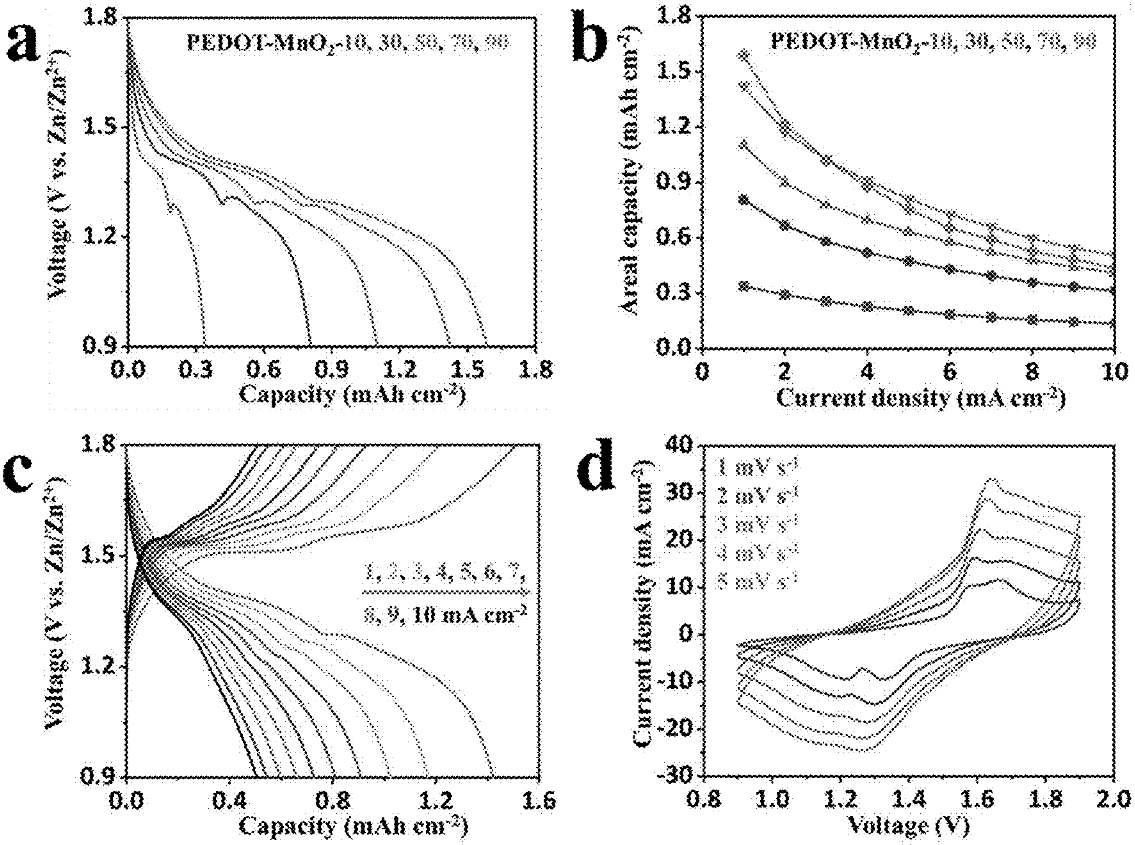
FIG. 3 shows graphical characterization results of the electrochemical performance of the manganese dioxide/3,4-ethylenedioxythiophene polymer microelectrode according to Example 1 of the present disclosure.

The manganese dioxide/3,4-ethylenedioxythiophene polymer microelectrode prepared in the step 4) according to Example 1 was subject to electrochemical performance characterization and the results are shown in FIG. 3.

FIG. 3(*a*) shows discharge curves of the manganese dioxide/3,4-ethylenedioxythiophene polymer microelectrode product at a current density of 1 mA $cm^{-2}$, from which it can be seen that the microelectrode has an ultra-stable discharge platform at 1.2 V to 1.4 V, proving its high capacity. FIG. 3(*b*) shows area capacitance curves of manganese dioxide/3,4-ethylenedioxythiophene polymer microelectrodes with different thicknesses at a current density of 1 mA $cm^{-2}$ to 10 mA $cm^{-2}$, and the retention rate of area capacitance is good with the increase of thickness, proving that high-mass loading can be provided and efficient ion transport can also be achieved at the 70th cycle. FIG. 3(*c*)

shows charge-discharge curves of the manganese dioxide/3,4-ethylenedioxythiophene polymer microelectrode at a current density of 1 mA $cm^{-2}$ to 10 mA $cm^{-2}$, illustrating high-symmetry, stable discharge curves, and a high voltage platform. FIG. 3(*d*) shows cyclic voltammetry curves of the microelectrode at 1 mV $s^{-1}$ to 5 mV $s^{-1}$, from which it can be found that two Mn reduction peaks corresponding to 1.4 V and 1.2 V in the curve at 1 mV $s^{-1}$ reveal mutual conversion of $Mn^{4+}$ and $Mn^{2+}$ and correspond to its charge-discharge curve, which also fully demonstrates the excellent electrochemical performance of the microbattery.

Figure 4:
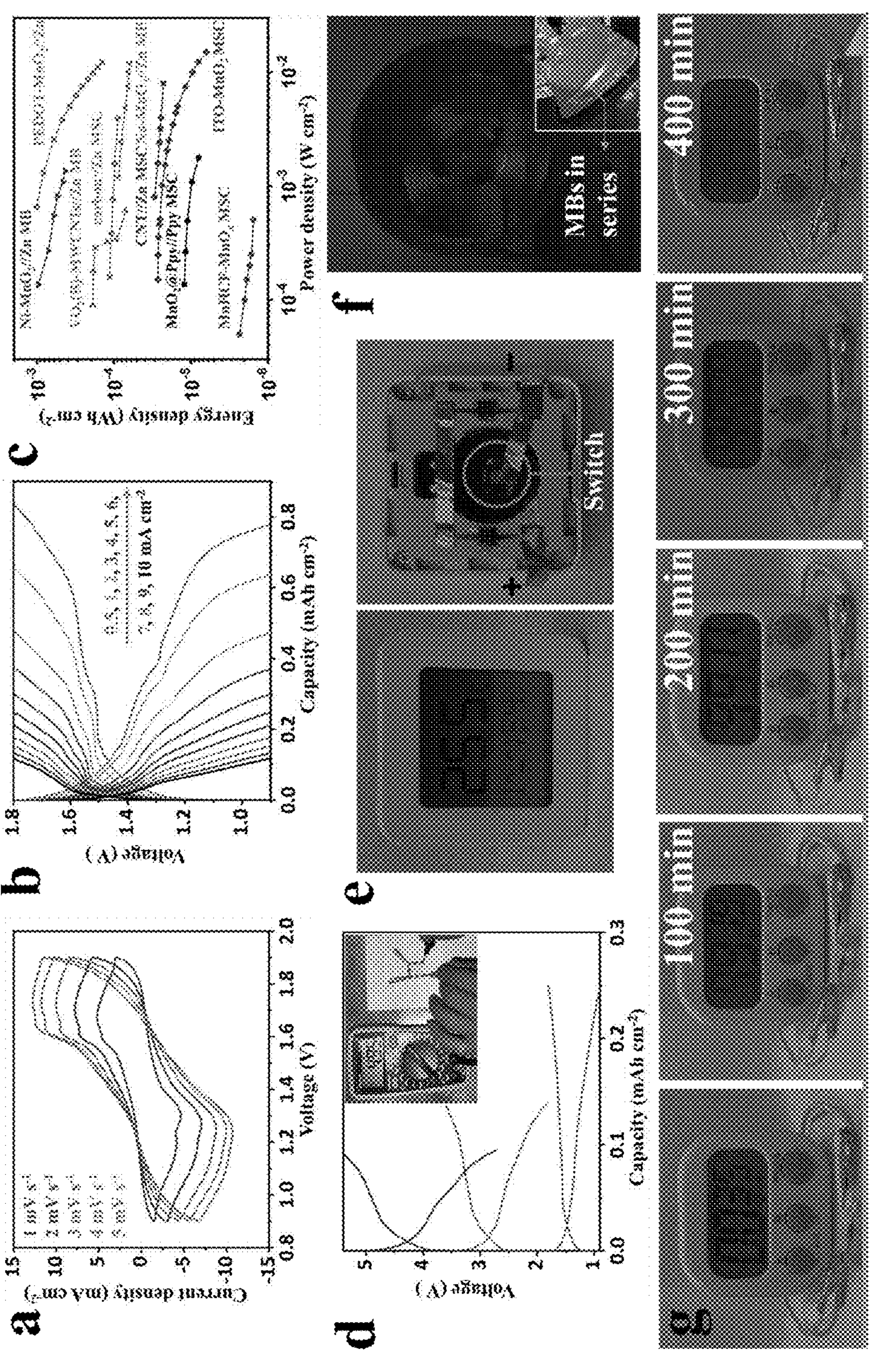
FIG. 4 shows electrochemical performance characterization graphs and application demonstration diagrams of the microbattery according to Example 1 of the present disclosure.

The microbattery prepared according to Example 1 was subject to electrochemical performance characterization and application demonstration, and the results are as shown in FIG. 4.

FIG. 4(*a*) shows cyclic voltammetry curves at different scan rates of 1 mV $s^{-1}$ to 5 mV $s^{-1}$ of the microbattery obtained by assembling the manganese dioxide/3,4-ethylenedioxythiophene polymer microelectrode and the zinc anode microelectrode, from which it can be seen that shapes are consistent, which fully demonstrates excellent rate performance and highly reversible redox reaction. FIG. 4(*b*) shows charge-discharge curves at different current densities from 0.5 mA $cm^{-2}$ to 10 mA $cm^{-2}$, illustrating the stable discharge platform at 1.2 V to 1.4 V. FIG. 4(*c*) is a Ragone plot of the microbattery with a high energy density while keeping a high power density, which still exhibits great advantages compared with many reported work. FIG. 4(*d*) shows that voltage and capacitance are increased by times after the microbattery is connected in series, proving the high integration and expandability of the microbattery. FIGS. 4(*e*)-4(*g*) show application demonstration diagrams of the microbattery obtained by assembling the manganese dioxide/3,4-ethylenedioxythiophene polymer microelectrode and the zinc anode microelectrode. Here, FIG. 4(*e*) shows the high flexibility of the microbattery after being integrated with a polyethylene terephthalate (PET) substrate. An ultra-high voltage output of more than 10 V can be stably achieved through a series connection, which lays a foundation for realizing commercial microbatteries. FIG. 4(*f*) shows that the microbattery is equipped on a blade surface of an axial-flow fan with high-speed rotation, high vibration, and high wind pressure to stably supply power to an LED and achieve long-time safe operation under high-speed environments, demonstrating in-situ monitoring of high-speed rotating components. FIG. 4(*g*) shows supplying power to an electronic timer by a single microbattery, which achieves a long service time of more than 400 minutes.

Compared with existing microbatteries fabricated through a bottom-up approach, this exemplary product meets the plug-in compatibility requirements and thus much better fits actual requirements, which fully reveals a great potential of this exemplary product combined with an existing chip integration process.

Example 2

This example provides a method for preparing a microbattery, which is different from Example 1 in that:

in the step 1), deposition was conducted for 120 s at a constant voltage of −4.5 V to obtain a porous metal microelectrode; and the remaining steps and participating materials were the same as those in Example 1.

Example 3

This example provides a method for preparing a microbattery, which is different from Example 1 in that:

in the step 11), the microbattery was integrated with a pressure sensor in a tire pressure monitoring device to construct an in-situ tire pressure micro monitoring system.

In summary, the present disclosure provides a microbattery used in a sensor system for monitoring high-speed rotating and enclosed components. Compared with a traditional button microbattery, the microbattery prepared by the present disclosure has the advantages of small size (area: 0.14 $cm^2$), thin thickness (0.2 mm), light weight (100 mg), extremely high power density/energy density, simplicity in preparation, easiness for integration, and the like.

Although the present disclosure is disclosed as above, the protection scope disclosed in the present disclosure is not limited thereto. Those skilled in the art can make various changes and modifications without departing from the spirit and scope of the present disclosure, and all these changes and modifications shall fall within the protection scope of the present disclosure.

What is claimed is:

1. A method for preparing a microbattery, including the following steps:

S1: preparing a manganese dioxide/3,4-ethylenedioxythiophene polymer microelectrode comprising:

S11: mixing nickel sulfate and ammonium sulfate to obtain a mixed solution A; and in the mixed solution A, using a metal-based micro interdigital microelectrode as a first working electrode and constructing a vertical three-dimensional porous structure composed of micron nickel particle clusters on the surface of the metal-based micro interdigital microelectrode by adopting a bubble-templated electrodeposition method; and

S12: mixing manganese acetate and 3,4-ethylenedioxythiophene to obtain a mixed solution B; and in the mixed solution B, using the vertical three-dimensional porous structure composed of micron nickel particle clusters as a second working electrode and adopting an electrodeposition process at a cyclic voltammetry electrodeposition process to obtain the manganese dioxide/3,4-ethylenedioxythiophene polymer microelectrode; wherein the manganese dioxide/3,4-ethylenedioxythiophene polymer microelectrode is a vertical three-dimensional porous structure;

S2: preparing a zinc-coated carbon nanotube microelectrode comprising:

S21: dispersing carbon nanotubes into an ethanol solution, adding magnesium nitrate, and mixing a resulting mixture uniformly to obtain a mixed solution C; and in the mixed solution C, using a platinum sheet and a brass microelectrode as a cathode and an anode, respectively, and adopting an electrophoresis process under a constant voltage power supply to obtain an interdigital microelectrode; and

S22: mixing zinc sulfate and sodium sulfate to obtain a mixed solution D; and in the mixed solution D, using the interdigital microelectrode as a third working electrode and adopting a constant voltage deposition method to deposit a metal zinc nanosheet on the surface of the third working electrode to obtain the zinc-coated carbon nanotube microelectrode; and

S3: assembling the microbattery comprising:

S31: using the manganese dioxide/3,4-ethylenedioxythiophene polymer microelectrode and the zinc-coated carbon nanotube microelectrode as a cathode and an anode, respectively, and assembling the cathode and anode under an optical microscope; and S32: coating a surface of the assembled electrode with a manganese sulfate/zinc sulfate/xanthan gum gel electrolyte, and conducting packaging to obtain the microbattery.

2. The method according to claim 1, wherein in the mixed solution A, a mass ratio of the nickel sulfate to the ammonium sulfate is 1:1 to 1:10; and in the mixed solution B, the mass ratio of the manganese acetate to the 3,4-ethylenedioxythiophene is 1:2 to 10:1.

3. The method according to claim 2, wherein in the step S11, the adopting a three-electrode deposition method at a constant voltage comprises: using a metal-based interdigital microelectrode as the first working electrode, a platinum sheet as a counter electrode, and a silver/silver chloride electrode as a reference electrode, and conducting deposition at a constant voltage of −3 V to −5 V for 10 s to 200 s.

4. The method according to claim 3, wherein in the step S12, the electrodeposition process comprises: using a metal-based interdigital microelectrode as the first working electrode, a platinum sheet as a counter electrode, and a silver/silver chloride electrode as a reference electrode, and conducting cyclic deposition for 10 to 200 cycles at a scan rate of 1 mV s-1 to 50 mV s-1 and at a voltage of 0 V to 0.9 V.

5. The method according to claim 1, wherein in the mixed solution C, a mass ratio of the carbon nanotubes to the magnesium nitrate is 1:2 to 10:1; and in the mixed solution D, a mass ratio of the zinc sulfate to the sodium sulfate is 1:1 to 5:1.

6. The method according to claim 5, wherein in the step S22, the constant voltage deposition method comprises: conducting deposition at a constant voltage of 10 V to 60 V for 1 min to 30 min.

7. The method according to claim 1, wherein in the step S32, a method for preparing the manganese sulfate/zinc sulfate/xanthan gum gel electrolyte comprises: adding manganese sulfate and zinc sulfate into water, sonicating and stirring a resulting mixture uniformly, and then adding xanthan gum and mixing a resulting mixture uniformly.

8. A microbattery, wherein the microbattery is prepared by the method for preparing a microbattery according to claim 1.

* * * * *